(12) United States Patent
Akita et al.

(10) Patent No.: US 8,374,452 B2
(45) Date of Patent: Feb. 12, 2013

(54) METHOD AND APPARATUS FOR FAST CELL SEARCH

(75) Inventors: Hidenori Akita, Higashimurayama (JP); Masaya Fukuta, Meguro-ku (JP); Hiroshi Hayashi, Nishitokyo (JP)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/081,646

(22) Filed: Apr. 7, 2011

(65) Prior Publication Data

US 2011/0182264 A1 Jul. 28, 2011

Related U.S. Application Data

(63) Continuation of application No. 11/278,458, filed on Apr. 3, 2006, now abandoned.

(51) Int. Cl.
*G06K 9/00* (2006.01)
(52) U.S. Cl. ........ 382/253; 370/350; 370/510; 370/210; 370/324; 370/343; 370/203
(58) Field of Classification Search .......... 370/210, 370/324, 343, 203, 350, 510; 382/253
See application file for complete search history.

(56) References Cited

U.S. PATENT DOCUMENTS

2006/0039451 A1 2/2006 Zhuang et al.
2008/0318567 A1 12/2008 Popovic et al.

OTHER PUBLICATIONS

Lee et al: "OFDM uplink ranging for IEEE 802.16e using modified generalized chirp-like polyphase sequences", IEEE, 2005.*
Zhuang, et al., "GCL-Based Preamble Design for 1024,512 and 128 FFT Sizes in OFDMA PHY Layer," IEEE C80216e-4/241rl, IEEE 802.16 Broadband Wireless Access Working Group<http://ieee802.org/16>, Aug. 29, 2004.
Motorola: "EUTRA Downlink Numerology and Design", R1-050583, 3GPP TSG RAN WG1 Ad Hoc on LTE, Sophia Antipolis, France, Jun. 20-21, 2005, all pages.
Motorola, Nokia, Samsung: "Text Proposal: Simulation Assumptions and Evaluation for EUTRA", TSG RAN WG1 #41bis, Tdoc # R1-050585, Sophia-Antipolis, France, Jun. 20-21, 2005, all pages.
3GPP TR 25.892 v6.0.0 (Jun. 2004) 3rd Generation Partnership Project; Technical Specification Group Radio Access Network; Feasibility Study for Orthogonal Frequency Division Multiplexing (OFDM) for UTRAN enhancement (Release 6), all pages.
Argyropoulos, Yiannis et al.: "Dynamic Channel Allocation in Interference-Limited Cellular Systems With Uneven Traffic Distribution", IEEE Transactions on Vehicular Technology, vol. 48, No. 1, Jan. 1999, pp. 224-232.

* cited by examiner

*Primary Examiner* — Matthew Bella
*Assistant Examiner* — Ruiping Li

(57) ABSTRACT

The GCL sequence index of each cell/sector is assigned so that a difference of the indices between adjacent cells/sectors is more than N, where N≧1. During GCL index detection, the adjacent N−1 indices of an index with the largest magnitude can be deleted from handoff candidate cell indices.

21 Claims, 5 Drawing Sheets

100

107

200

METHOD AND APPARATUS FOR FAST CELL SEARCH

FIELD OF THE INVENTION

The present invention relates generally to fast cell search, and in particular to a method and apparatus for fast identification of a service cell or sector during initial or periodic access, or handover in a mobile communication system.

BACKGROUND OF THE INVENTION

In a mobile cellular network, the geographical coverage area is divided into many cells, each of which is served by a base station (BS). Each cell can also be further divided into a number of sectors. When a mobile station (MS) is powered up, it needs to search for a BS to register with. Also, when the MS finds out that the signal from the current serving cell becomes weak, it should prepare for a handover to another cell/sector. Because of this, the MS is required to search for a good BS for communication. The ability to quickly identify a BS for initial registration or handover is important for reducing the processing complexity and thus lowering the power consumption.

The cell search function is often performed based on a cell-specific reference signal (or preamble) transmitted periodically. A straightforward method is to perform an exhaustive search by trying to detect each reference signal and then determine the best BS. There are two important criteria when determining reference sequences for cells or sectors. First, the reference sequences should allow good channel estimation to all the users within its service area, which is often obtained through a correlation process with the reference of the desired cell. In addition, since a mobile will receive signals sent from other sectors or cells, a good cross correlation between reference signals is important to minimize the interference effect on channel estimation to the desired cell.

Just like auto-correlation, the cross-correlation between two sequences is a sequence itself corresponding to different relative shifts. Precisely, the cross-correlation at shift-d is defined as the result of summing over all entries after an element-wise multiplication between a sequence and another sequence that is conjugated and shifted by d entries with respect to the first sequence. "Good" cross correlation means that the cross correlation values at all shifts are as even as possible so that after correlating with the desired reference sequence, the interference can be evenly distributed and thus the desired channel can be estimated more reliably. Minimization of the maximal cross-correlation values at all shifts, which is reached when they are all equal, is refer to as "optimal" cross correlation.

Prior-art techniques, such as those described in US Patent Application Publication No. 2006/0039451 A1, (which is incorporated by reference herein) describe the use of reference sequences that are constructed from distinct "classes" of a Generalized Chirp-Like (GCL) sequence. By assigning a base station a particular index of a GCL sequence, the identification of a sequence index will therefore provide the identification of the base station.

While the above-described technique allows for a desirable reference signal, multi-path fading and inter-cell-interference may cause a detector to show an abnormally high correlation for GCL sequences having index values close to the index values being transmitted by base stations. Thus, for example, if a base station is transmitting a GCL sequence index of 25, a detector may have high correlation values to sequences 23 and 27, simply due to multi-path fading and inter-cell interference. This will lead the detector to falsely believe that there exist base stations utilizing index values 23 and 27. Therefore, a need exists for a method and apparatus for a fast cell search technique that utilizes GCL reference sequences and reduces abnormally high correlations due to multi-path fading and inter-cell interference.

DETAILED DESCRIPTION OF THE DRAWINGS

To address the above-mentioned need, a method and apparatus for fast cell search is provided herein. During operation, a GCL sequence index of each cell/sector is assigned so that a difference of the indices between adjacent cells/sectors is more than N, where N≧1. During GCL index detection, the adjacent N−1 indices of an index with the largest magnitude can be deleted from handoff candidate cell indices. This greatly reduces abnormally high GCL correlations due to multi-path fading and inter-cell interference.

The present invention encompasses a method for fast cell search. The method comprises the steps of receiving an over-the-air communication, determining powers of a plurality of GCL indices from the over-the-air communication, and determining a GCL index having a maximum power. GCL indices surrounding the GCL index having the maximum power are eliminated and a handoff candidate cell indices are determined based on the powers of a plurality of GCL indices excluding the eliminated GCL indices.

The present invention additionally encompasses an apparatus comprising a GCL sequence index detector outputting a plurality of GCL indices and their power, and masking circuitry determining a GCL index with a maximum power, eliminating adjacent indices, and outputting a plurality of GCL indices and their associated power, excluding the eliminated adjacent indices.

The present invention additionally encompasses a base station comprising a transmitter transmitting a first GCL reference signal in a first sector, and a second transmitter transmitting a second GCL reference signal in a second sector, wherein a GCL sequence index of the first GCL reference signal is more than N indices from a sequence index of the second GCL reference signal.

Figure 1:
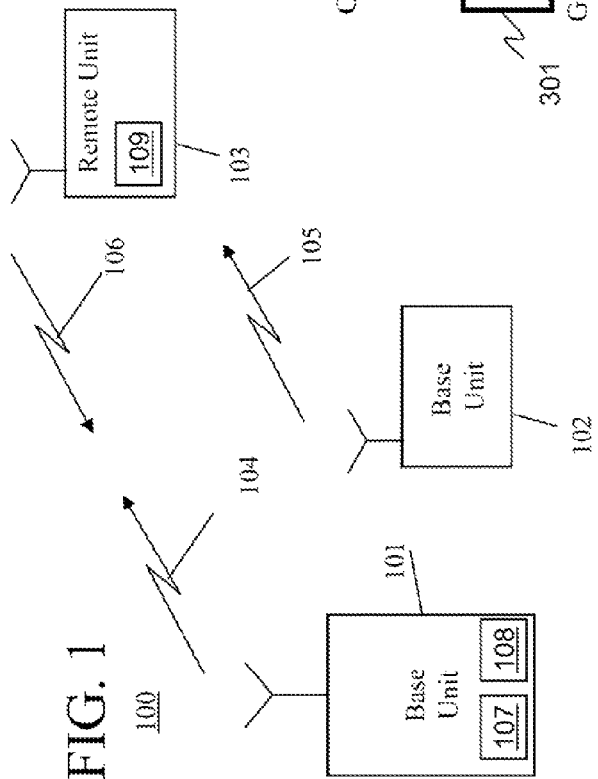
FIG. 1 is a block diagram of a communication system.

Turning now to the drawings, where like numerals designate like components, FIG. 1 is a block diagram of communication system 100 that utilizes reference transmissions. Communication system utilizes an Orthogonal Frequency Division Multiplexing (OFDM) protocol; however in alternate embodiments communication system 100 may utilize other digital cellular communication system protocols such as a Code Division Multiple Access (CDMA) system protocol, a Frequency Division Multiple Access (FDMA) system protocol, a Spatial Division Multiple Access (SDMA) system protocol or a Time Division Multiple Access (TDMA) system protocol, or various combinations thereof.

As shown, communication system 100 includes base unit 101 and 102, and remote unit 103. A base unit or a remote unit may also be referred to more generally as a communication unit. The remote units may also be referred to as mobile units. A base unit comprises a transmit and receive unit that serves a number of remote units within a sector. As known in the art, the entire physical area served by the communication network may be divided into cells, and each cell may comprise one or more sectors. When multiple antennas are used to serve each sector to provide various advanced communication modes (e.g., adaptive beamforming, transmit diversity, transmit SDMA, and multiple stream transmission, etc.), multiple base units can be deployed. These base units within a sector may be highly integrated and may share various hardware and software components. For example, all base units co-located together to serve a cell can constitute what is traditionally known as a base station. Base units 101 and 102 transmit downlink communication signals 104 and 105 to serving remote units on at least a portion of the same resources (time, frequency, or both). Remote unit 103 communicates with one or more base units 101 and 102 via uplink communication signal 106. A communication unit that is transmitting may be referred to as a source communication unit. A communication unit that is receiving may be referred to as a destination or target communication unit.

It should be noted that while only two base units and a single remote unit are illustrated in FIG. 1, one of ordinary skill in the art will recognize that typical communication systems comprise many base units in simultaneous communication with many remote units. It should also be noted that while the present invention is described primarily for the case of downlink transmission from multiple base units to multiple remote units for simplicity, the invention is also applicable to uplink transmissions from multiple remote units to multiple base units. It is contemplated that network elements within communication system 100 are configured in well known manners with processors, memories, instruction sets, and the like, which function in any suitable manner to perform the function set forth herein.

Figure 2:
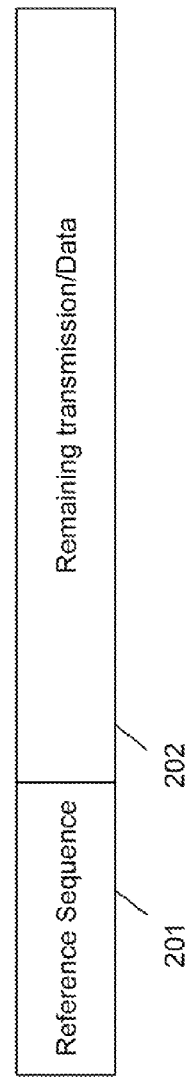
FIG. 2 illustrates reference signal transmission for the communication system of FIG. 1.

As discussed above, reference assisted modulation is commonly used to aid in many functions such as channel estimation and cell identification. With this in mind, base units 101 and 102 transmit reference sequences at known time intervals as part of their downlink transmissions. Remote unit 103, knowing the set of sequences that different cells can use and the time interval, utilizes this information in cell search and channel estimation. Such a reference transmission scheme is illustrated in FIG. 2. As shown, downlink transmissions 200 from base units 101 and 102 typically comprise reference sequence 201 followed by remaining transmission 202. The same or a different sequence can show up one or multiple times during the remaining transmission 202. Thus, each base unit within communication system 100 comprises reference channel circuitry 107 that transmits one or more reference sequences along with data channel circuitry 108 transmitting data. In a similar manner, each remote unit 103 within communication system 100 comprises GCL sequence detector 109.

It should be noted that although FIG. 2 shows reference sequence 201 existing at the beginning of a transmission, in various embodiments of the present invention, the reference channel circuitry may include reference sequence 201 anywhere within downlink transmission 200, and additionally may be transmitted on a separate channel. Remaining transmission 202 typically comprises transmissions such as, but not limited to, sending information that the receiver needs to know before performing demodulation/decoding (so called control information) and actual information targeted to the user (user data).

As discussed above, it is important for any reference sequence to have optimal cross-correlation. With this in mind, communication system 100 utilizes reference sequences constructed from distinct "classes" of chirp sequences with optimal cyclic cross-correlation. The construction of such reference sequences is described below. In a preferred embodiment of the invention, the method for fast cell search is based on such reference sequences.

In one embodiment, the time domain reference signal is an Orthogonal Frequency Division Multiplexing (OFDM) symbol that is based on N-point FFT. A set of length-$N_p$ sequences are assigned to base units in communication system 100 as the frequency-domain reference sequence (i.e., the entries of the sequence will be assigned onto a set of $N_p$ ($N_p <= N$) reference subcarriers in the frequency domain). The spacing of these reference subcarriers is preferably equal (e.g., 0, 1, 2, etc. in subcarrier(s)). The final reference sequences transmitted in time domain can be cyclically extended where the cyclic extension is typically longer than the expected maximum delay spread of the channel ($L_D$). In this case, the final sequence sent has a length equal to the sum of N and the cyclic extension length $L_{CP}$. The cyclic extension can comprise a prefix, postfix, or a combination of a prefix and a postfix. The cyclic extension is an inherent part of the OFDM communication system. The inserted cyclic prefix makes the ordinary auto-or cross-correlation appear as a cyclic correlation at any shift that ranges from 0 to $L_{CP}$. If no cyclic prefix is inserted, the ordinary correlation is approximately equal to the cyclic correlation if the shift is much smaller than the reference sequence length.

The construction of the frequency domain reference sequences depends on at least two factors, namely, a desired number of reference sequences needed in a network (K) and a desired reference length ($N_p$). In fact, the number of reference sequences available that has the optimal cyclic cross-correlation is P−1 where P is the smallest prime factor of $N_p$ other than "1" after factoring $N_p$ into the product of two or more prime numbers including "1". For example, the maximum value that P can be is $N_p-1$ when $N_p$ is a prime number. But when $N_p$ is not a prime number, the number of reference sequences often will be smaller than the desired number K. In order to obtain a maximum number of sequences, the reference sequence will be constructed by starting with a sequence whose length $N_G$ is a prime number and then performing modifications. In the preferred embodiment, one of the following two modifications is used:

1. Choose $N_G$ to be the smallest prime number that is greater than $N_p$ and generate the sequence set. Truncate the sequences in the set to $N_p$; or
2. Choose $N_G$ to be the largest prime number that is smaller than $N_p$ and generate the sequence set. Repeat the beginning elements of each sequence in the set to append at the end to reach the desired length $N_p$.

The above design of requiring $N_G$ to be a prime number will give a set of $N_G-1$ sequences that has ideal auto correlation and optimal cross correlation. However, if only a smaller number of sequences are needed, $N_G$ does not need to be a prime number as long as the smallest prime factor of $N_G$ excluding "1" is larger than K.

When a modification such as truncating or inserting is used, the cross-correlation will not be precisely optimal anymore. However, the auto-and cross-correlation properties are still acceptable. Further modifications to the truncated/extended sequences may also be applied, such as applying a unitary transform to them.

It should also be noted that while only sequence truncation and cyclic extension were described above, in alternate embodiments of the present invention there exist other ways to modify the GCL sequences to obtain the final sequences of the desired length. Such modifications include, but are not limited to extending with arbitrary symbols, shortening by puncturing, etc. Again, further modifications to the extended/punctured sequences may also be applied, such as applying a unitary transform to them.

As discussed above, in the preferred embodiment of the present invention Generalized Chirp-Like (GCL) sequences are utilized for constructing reference sequences. There are a number of "classes" of GCL sequences and if the classes are chosen carefully (see GCL property below); sequences with those chosen classes will have optimal cross-correlation and ideal autocorrelation. Class-u GCL sequence (S) of length $N_G$ are defined as:

$$S_u = (a_u(0)b, a_u(1)b, \ldots, a_u(N_G-1)b), \quad (1)$$

where b can be any complex scalar of unit amplitude and $$a_u(k) = \exp\left(-j2\pi u \frac{k(k+1)/2 + qk}{N_G}\right), \quad (2)$$

where,
u=1, ... $N_G$-1 is known as the "class" of the GCL sequence,
k=0, 1, ... $N_G$-1 are the indices of the entries in a sequence,
q=any integer.

Each class of GCL sequence can have infinite number of sequences depending on the particular choice of q and b, but only one sequence out of each class is used to construct one reference sequence. Notice that each class index "u" produces a different phase ramp characteristic over the elements of the sequence (i.e., over the "k" values).

It should also be noted that if an $N_G$-point DFT (Discrete Fourier Transform) or IDFT (inverse DFT) is taken on each GCL sequence, the member sequences of the new set also have optimal cyclic cross-correlation and ideal autocorrelation, regardless of whether or not the new set can be represented in the form of (1) and (2). In fact, sequences formed by applying a matrix transformation on the GCL sequences also have optimal cyclic cross-correlation and ideal autocorrelation as long as the matrix transformation is unitary. For example, the $N_G$-point DFT/IDFT operation is equivalent to a size-$N_G$ matrix transformation where the matrix is an $N_G$ by $N_G$ unitary matrix. As a result, sequences formed based on unitary transformations performed on the GCL sequences still fall within the scope of the invention, because the final sequences are still constructed from GCL sequences. That is, the final sequences are substantially based on (but are not necessarily equal to) the GCL sequences.

If $N_G$ is a prime number, the cross-correlation between any two sequences of distinct "class" is optimal and there will be $N_G$-1 sequences ("classes") in the set. When a modification such as truncating or inserting is used, the modified reference sequence can be referred to as nearly-optimal reference sequences that are constructed from GCL sequences.

The integer "u" is the GCL sequence index. This sequence index is assigned to each cell. $N_G$ in the equation is the length of the GCL sequence. A total of $N_G$-1 different sequences are available for use in different cells. $N_G$ is a prime number equal or near the needed sequence length. If the needed sequence length is not a prime number, the next-largest prime number can be used for NG and the resulting GCL sequence can be truncated to the desired length $N_p$.

Figure 3:
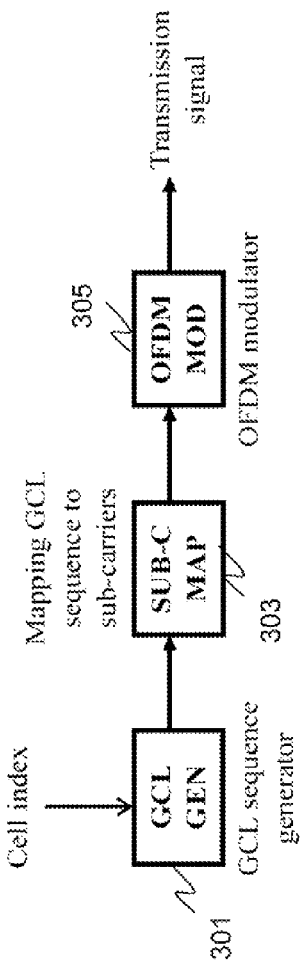
FIG. 3 is a block diagram of a transmitter.

FIG. 3 is a block diagram of transmitter 107 used to transmit a reference (e.g., a GCL) sequence. The cell index enters GCL sequence generator 301 and a GCL sequence with the particular index is output to subcarrier mapper 303. Subcarrier mapper 303 maps the GCL sequence with unique cell index to sub-carriers and outputs the subcarriers to OFDM modulator 305. Modulator 305 then transmits the time-domain reference signal as illustrated in FIG. 2.

Figure 4:
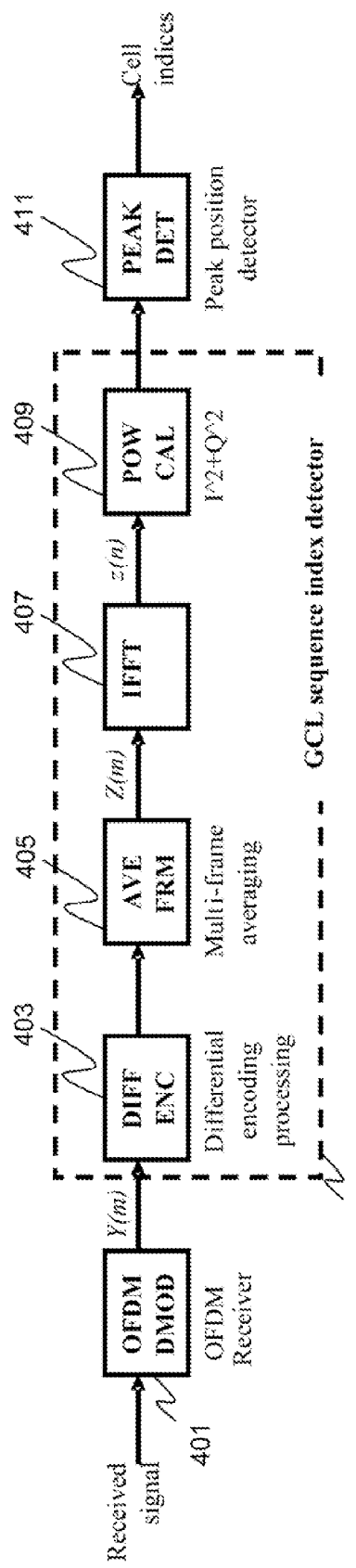
FIG. 4 is a block diagram of a GCL sequence detector.

FIG. 4 is a block diagram of GCL sequence detector 109. During operation, OFDM receiver 401 transforms the received signal to frequency domain and extracts sub-carrier symbols as the received GCL sequence. The sub-carrier symbols are sent to the GCL sequence index detector 109 where they enter differential encoder 403.

The following equation shows the differential encoder output in the case where a GCL sequence of a cell is received. Y(m) in the equation is the GCL sequence index detector input on the m-th sub-carrier. H(m) in the equation is the channel response of the m-th sub-carrier. This equation assumes the channel response of adjacent sub-carriers is almost the same. The differential encoder output is a complex exponential with a frequency that corresponds to the original sequence index.

$$Z(m) = Y(m) * Y^*(m+1) \approx |H(m)|^2 S_u(m) S_u^*(m+1)) =$$
$$|H(m)|^2 \exp\left\{j2\pi u \frac{m+1}{N_G}\right\},$$
$$m = 1, \ldots, N_p - 1$$

Each of differential encoder output is optionally averaged by frame averaging circuitry 405 over multiple frames to enhance robustness. IFFT 407 re-transforms the averaged differential encoder outputs to time domain, where T is the IFFT size.

$$\{z(n)\} = IFFT_T(\{Z(m)\}), m=1, \ldots, N_p-1, n=1, \ldots, T$$

Power calculator 409 calculates the power of each possible index value, $|z(n)|^2$ (n=1, ..., T), and outputs this information to peak position detector 411. The indices with larger magnitude in the GCL sequence index detector output are detected and are converted into cell indices by detector 411.

$$u = \frac{n}{T} \cdot N_G$$

These detected cell indices could be stored as handoff cell indices including camp-on cell.

As described above, while the above-described technique allows for a desirable reference signal, multi-path fading and inter-cell-interference may cause a detector to show an abnormally high correlation for GCL sequences having index values close to the index values being transmitted by base stations. Thus, for example, if a base station is transmitting a GCL sequence index of 25, a detector may have high correlation values to sequences 23 and 27, simply due to multi-path fading and inter-cell interference. This will lead the detector to falsely believe that there exist base stations utilizing index values 23 and 27. This is illustrated in FIG. 5.

Figure 5:
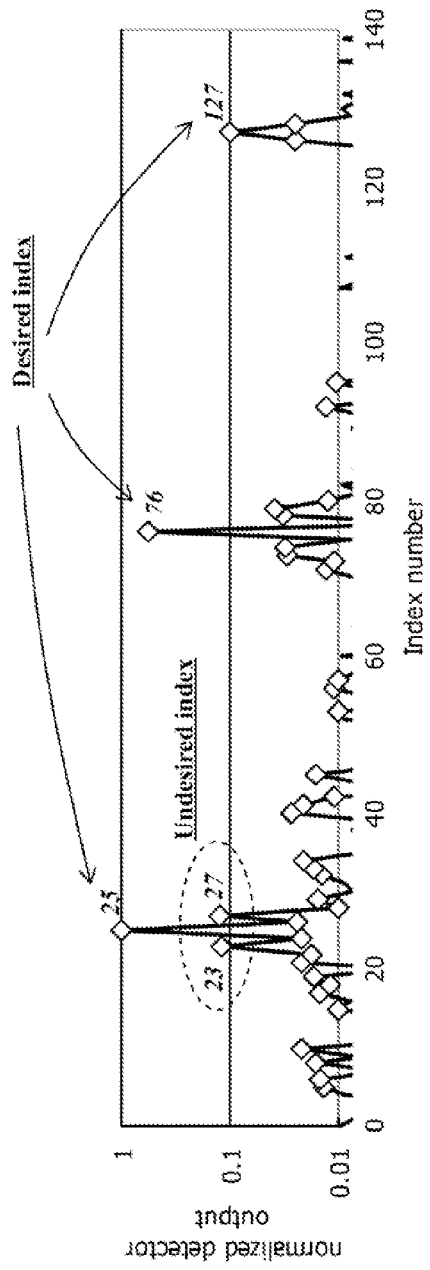
FIG. 5 illustrates abnormally high GCL correlations.

As shown in FIG. 5, base stations are currently transmitting with GCL index values of 25, 76, and 127. Peak detector 411 will assume that the indices, which should be detected as handoff cell indices, are 25, 76 and 127. However, because the GCL sequence index detector output of the index 127 is smaller than that of the undesired index 27, the desired index 127 is not detected as a handoff cell index. The cause of this error is multi-path fading and inter-cell-interference. In order to detect index 127, more multi-frame averaging would be required. Therefore, it takes long periods of time for prior-art detection of the desired handoff candidate cell indices.

In order to address this issue, the GCL sequence index of each cell is assigned so that the difference of the indices between adjacent cells/sectors is more than N, where N≧1. In other words, N is a minimum number of indices between any two sectors/cells. This proposed method assures that the difference of the indices between handoff candidate cells is more than N.

Figure 6:
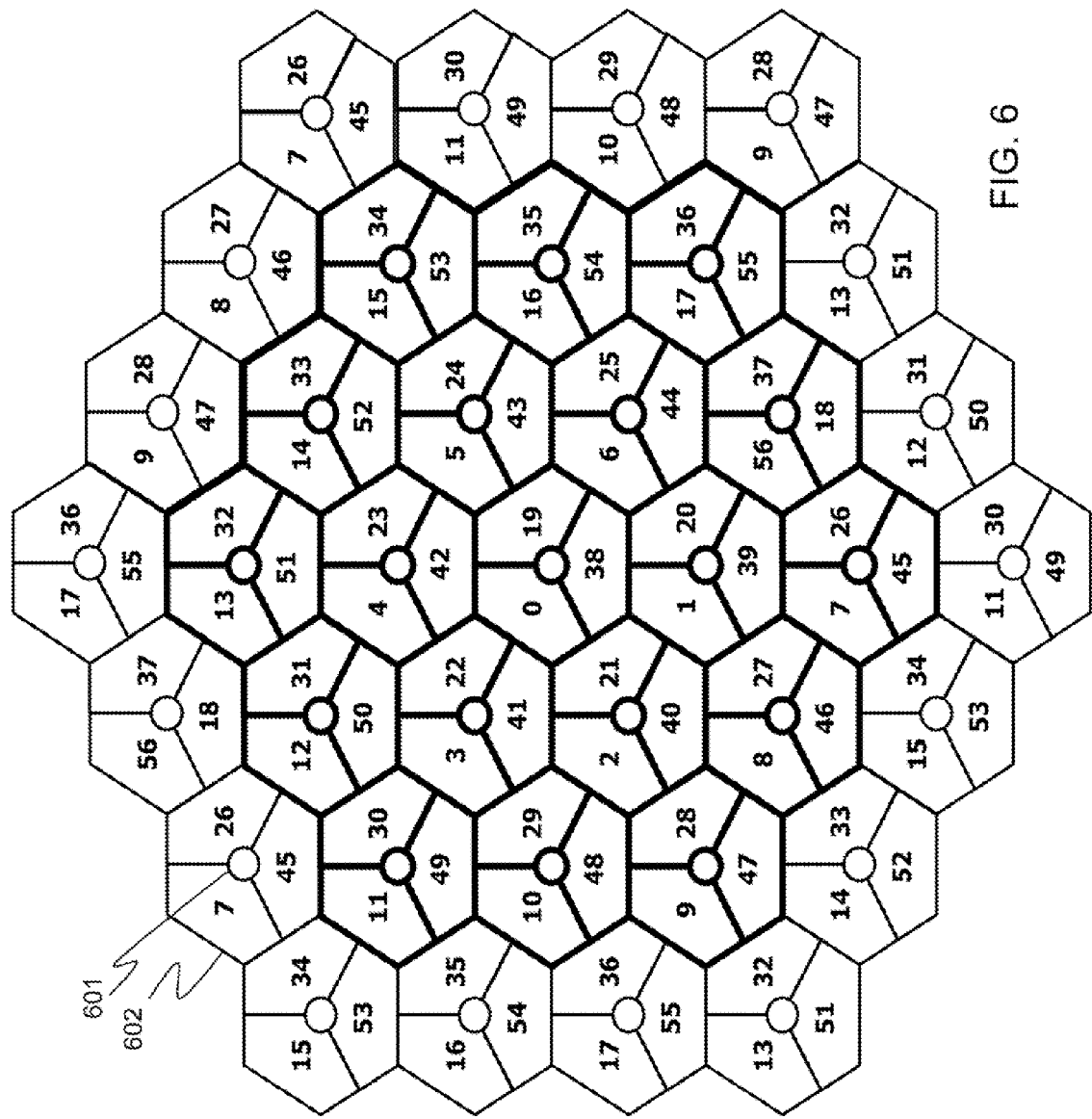
FIG. 6 illustrates a GCL deployment within a 3-sectored communication system.

FIG. 6 shows an example of the code index assignment. More particularly, FIG. 6 shows a plurality of base stations 601 (only one labeled), each having three sectors 602 (only one sector labeled). Because each base station 601 will have three sectors 602, each base station 601 comprises at least three base units 101 (at least one for each sector). Thus, each base station 601 will comprise at least a transmitter transmitting a first GCL reference signal in a first sector, a second transmitter transmitting a second GCL reference signal in a second sector, and a third transmitter transmitting a third GCL reference signal an a third sector. As described, the first, second, ant third GCL reference signal indices are more than N indices from any adjacent sector.

Each sector in FIG. 6 is labeled with its particular GCL sequence index. FIG. 6 assumes 3 sectors, and hence 3 base units per cell site (base station) and 57 (19×3) indices are reused by 19 base stations 601. The index of each sector is represented as ID(k,l)=k+l*M, where k is cell number, l is sector number and M is number of cells reusing available indices. Note, the index 56 and the index 18 are swapped in FIG. 6. Therefore, the minimum number of indices between adjacent cells N becomes 5, which in this case equals the number of indices between index 13 and 18. Because of this, the adjacent N−1 indices of the index with the largest magnitude in the GCL sequence index detector output can be deleted from handoff candidate cell indices.

Figure 7:
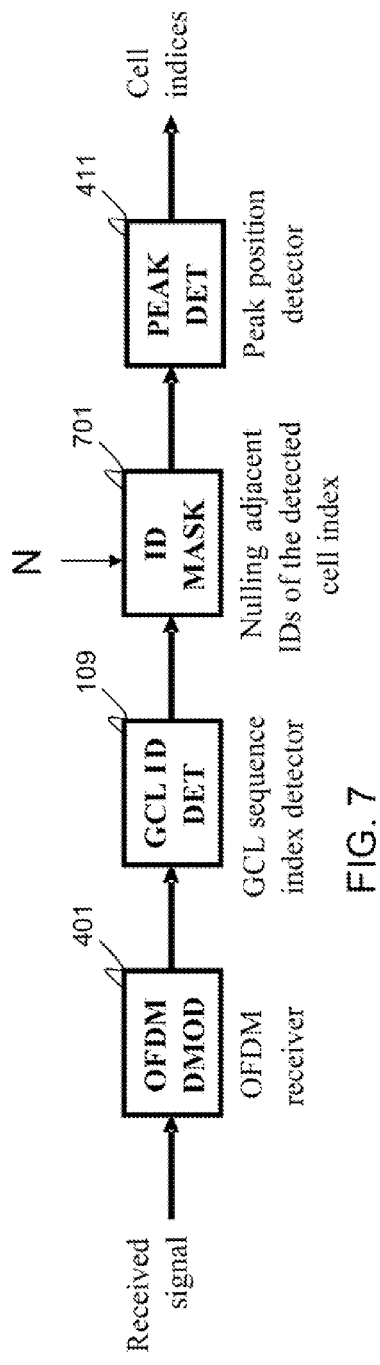
FIG. 7 is a block diagram of a receiver designed to remove adjacent N−1 indices.
Figure 8:
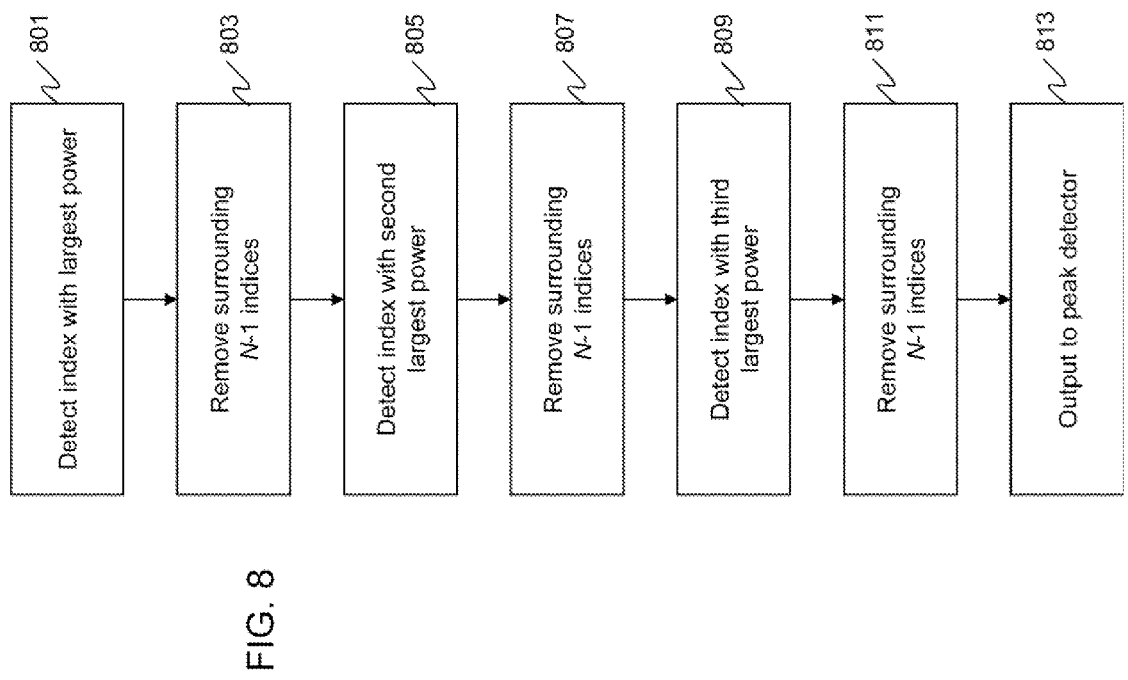
FIG. 8 is a flow chart showing operation of masking circuitry.

FIG. 7 is a block diagram of a receiver designed to remove adjacent N−1 indices surrounding an index. As is evident, the receiver of FIG. 7 is identical to the receiver of FIG. 4 except for the addition of masking circuitry 701. Masking circuitry 701 utilizes the code assignment characteristic that the difference of the indices between handoff candidate cells is more than N. Circuitry 701 receives a value for N and a number of candidate handoff cells. Circuitry 701 then deletes N−1 adjacent indices of the detected cell index from each candidate cell. FIG. 8 is a flow chart showing operation of circuitry 701 assuming the number of handoff candidate cell indices is three. Additionally, it is assumed that an over-the-air communication has been received containing GCL reference signals from potential handover candidates.

The logic flow begins at step 801 where circuitry 701 receives a power of a plurality of GCL indices from the over-the-air communication and detects the index with a largest power. As described above, the power values of each GCL index is output by GCL sequence index detector 109. At step 803, circuitry 701 eliminates the N−1 adjacent indices surrounding the index with the largest power. The logic flow continues to step 805 where circuitry 701 detects an index with a second largest power and eliminates N−1 adjacent indices surrounding the index with the second largest power (step 807). At step 809 circuitry 701 detects the index with the third largest power and eliminates the N−1 adjacent indices surrounding the index with the third largest power (step 811). Finally, at step 813 the indices and their normalized powers (excluding the eliminated indices) are output to peak detector 411. The detected three peak indices are output as handoff candidate cell indices.

As is evident, potential handoff candidate cells are determined based on the powers of the plurality of GCL indices excluding the eliminated GCL indices. More particularly, the peak indices output by peak detector 411 are based on the powers of a plurality of GCL indices excluding the eliminated GCL indices.

Figure 9:
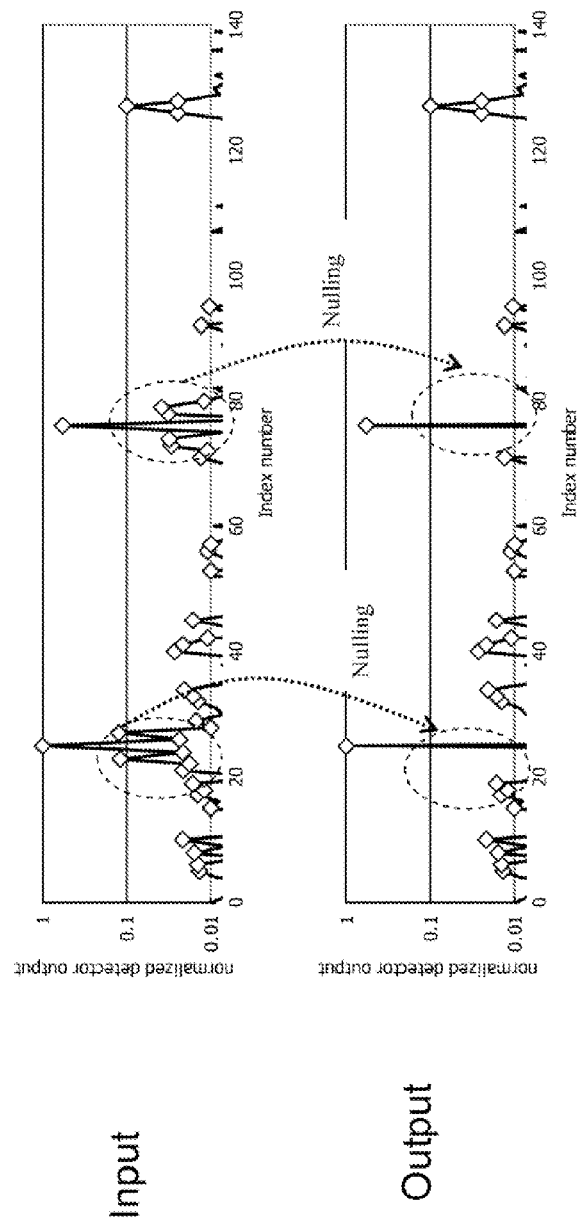
FIG. 9 illustrates input and output signals to and from the masking circuitry.

FIG. 9 shows an example of inputs and outputs of the index mask function. As is evident, the input to circuitry 701 shows high correlations surrounding index values 25 and 76. The output of circuitry 701 remove all power for the N−1 indices surrounding indices 25, 76, and 127. By adopting this proposed method, the false detection because of multi-path fading and inter-cell-interference is reduced without multi-frame averaging. That is to say, handoff candidate search time is reduced by this proposed method.

While the invention has been particularly shown and described with reference to a particular embodiment, it will be understood by those skilled in the art that various changes in form and details may be made therein without departing from the spirit and scope of the invention.

We claim:

1. A method for use in a base station in a wireless communication system for generating and transmitting an orthogonal frequency domain multiplexed (OFDM) signal comprising a plurality of subcarriers, wherein the base station includes a cell identification reference signal generator, a controller and transmitter circuitry, the method comprising the steps of:
   generating, by the cell identification reference signal generator, a cell identification reference signal;
   mapping, by the controller, the cell identification reference signal onto a set of subcarriers of the plurality of subcarriers of the OFDM signal;
   transmitting, by the transmitter circuitry, the OFDM signal including the cell identification reference signal
   wherein the cell identification reference signal is based on a GCL sequence with GCL sequence index selected from a set of GCL sequence indices such that any two GCL sequence indices in the set of GCL sequence indices are not adjacent.

2. The method in accordance with claim 1 wherein the step of generating the cell identification reference signal comprises the step of the cell identification reference signal generator generating the cell identification reference signal comprising cell identification information associated with the base station.

3. The method in accordance with claim 1 wherein the step of generating the cell identification reference signal comprises the step of the cell identification reference signal generator generating the cell identification reference signal based on the GCL sequence with the GCL sequence index comprising cell identification information associated with the base station.

4. The method in accordance with claim 1 wherein the step of generating the cell identification reference signal comprises the step of the cell identification reference signal generator generating the cell identification reference signal based on the GCL sequence with the GCL sequence index selected from a set of GCL sequence indices such that any two GCL sequence indices in the set of GCL sequence indices is more than N, where N>=1.

5. The method in accordance with claim 1 wherein the cell identification reference signal is based on a modification of the GCL sequence.

6. The method in accordance with claim 1 wherein the cell identification reference signal is based on a puncturing of one or more sequence elements of the GCL sequence.

7. The method in accordance with claim 1 wherein the cell identification reference signal is based on a GCL sequence with GCL sequence index, u, generated as, $S_u=(a_u(0)b, a_u(1)b, \ldots, a_u(N_G-1)b)$, where b can be any complex scalar of unit amplitude and $$a_u(k) = \exp\left(-j2\pi u \frac{k(k+1)/2 + qk}{N_G}\right),$$

where,
u=1, ... $N_G$-1 is known as the "class" of the GCL sequence or the GCL sequence index,
k=0, 1, ... $N_G$-1,
q=any integer.

8. A method for use in a remote unit receiver for receiving an orthogonal frequency domain multiplexed (OFDM) signal comprising a plurality of subcarriers, the remote unit receiver including a cell identification sequence detector, a controller and receiver circuitry, the method comprising the steps of:
receiving and demodulating the OFDM signal by the receive circuitry;
detecting, by the controller, a set of subcarriers of the plurality of subcarriers of the demodulated OFDM signal, wherein the set of subcarriers comprises cell identification reference signal,
detecting, by the cell identification sequence detector, the cell identification reference signal, wherein the cell identification reference signal comprises one or more cell identification reference signal sequence elements based on a GCL sequence, and wherein the cell identification sequence detector detects the cell identification reference signal in response to detecting a GCL sequence index of the GCL sequence from a set of GCL sequence indices such that any two GCL sequence indices in the set of GCL sequence indices are not adjacent.

9. The method in accordance with claim 8 wherein the cell identification sequence detector derives cell identification information in response to the cell identification reference signal, wherein the cell identification information is associated with a first transmitter of a base station transmitting the OFDM signal.

10. The method in accordance with claim 8 wherein the cell identification sequence detector derives cell identification information in response to the detected GCL sequence index of the cell identification reference signal, wherein the cell identification information is associated with a first transmitter of a base station transmitting the OFDM signal.

11. The method in accordance with claim 9 wherein the cell identification sequence detector derives cell identification information associated with a second transmitter of a base station in response to detecting a second GCL sequence index other than the detected GCL sequence index from the set of GCL sequence indices.

12. The method in accordance with claim 8 wherein the cell identification sequence detector detects the cell identification reference signal in response to detecting the GCL sequence index corresponding to a GCL index having a maximum received signal component associated with the received cell identification reference signal.

13. The method in accordance with claim 8 wherein the cell identification sequence detector detects the cell identification reference signal in response to detecting a GCL sequence index of the GCL sequence from a set of GCL sequence indices such that any two GCL sequence indices in the set of GCL sequence indices is more than N, where N>=1.

14. The method in accordance with claim 8 wherein the cell identification sequence detector derives cell identification information associated with a second transmitter of a base station in response to detecting a second GCL sequence index that is more than N where N>=1, GCL indices away than the detected GCL sequence index from the set of GCL sequence indices.

15. An apparatus for generating and transmitting an orthogonal frequency domain multiplexed (OFDM) signal comprising a plurality of subcarriers, the apparatus comprising:
a cell identification reference signal generator generating, a cell identification reference signal;
a controller mapping, the cell identification reference signal onto a set of subcarriers of the plurality of subcarriers of the OFDM signal;
a transmitter transmitting, the OFDM signal including the cell identification reference signal
wherein the cell identification reference signal is based on a GCL sequence with GCL sequence index selected from a set of GCL sequence indices such that any two GCL sequence indices in the set of GCL sequence indices are not adjacent.

16. The apparatus in accordance with claim 15 wherein the step of generating the cell identification reference signal comprises the step of the cell identification reference signal generator generating the cell identification reference signal comprising cell identification information associated with the base station.

17. The apparatus in accordance with claim 15 wherein the step of generating the cell identification reference signal comprises the step of the cell identification reference signal generator generating the cell identification reference signal based on the GCL sequence with the GCL sequence index comprising cell identification information associated with the base station.

18. An apparatus for receiving an orthogonal frequency domain multiplexed (OFDM) signal comprising a plurality of subcarriers, the apparatus comprising:
receiving circuitry receiving and demodulating the OFDM signal;
a controller detecting a set of subcarriers of the plurality of subcarriers of the demodulated OFDM signal, wherein the set of subcarriers comprises cell identification reference signal,
a cell identification sequence detector detecting the cell identification reference signal, wherein the cell identification reference signal comprises one or more cell identification reference signal sequence elements based on a GCL sequence, and wherein the cell identification sequence detector detects the cell identification reference signal in response to detecting a GCL sequence index of the GCL sequence from a set of GCL sequence indices such that any two GCL sequence indices in the set of GCL sequence indices are not adjacent.

19. The apparatus in accordance with claim 18 wherein the cell identification sequence detector derives cell identification information in response to the cell identification reference signal, wherein the cell identification information is associated with a base station transmitting the OFDM signal.

20. The apparatus in accordance with claim 18 wherein the cell identification sequence detector derives cell identification information in response to the detected GCL sequence index of the cell identification reference signal, wherein the cell identification information is associated with a base station transmitting the OFDM signal.

21. The apparatus in accordance with claim 18 wherein the cell identification sequence detector derives cell identification information associated with a second transmitter of a base station in response to detecting a second GCL sequence index other than the detected GCL sequence index from the set of GCL sequence indices.

* * * * *